United States Patent Office.

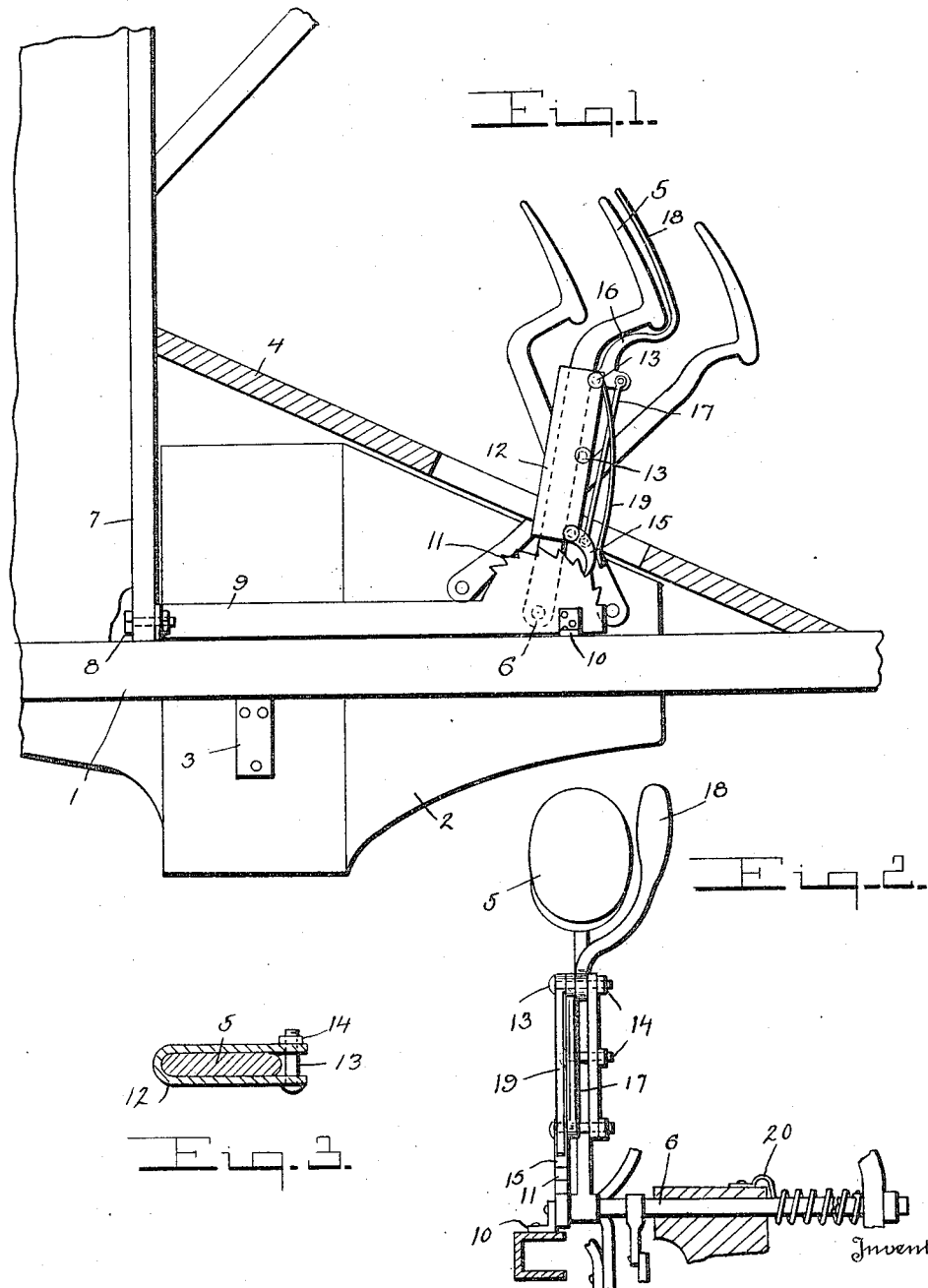

HARRY YARNALL, OF ROOSEVELT, WASHINGTON.

FOOT-LEVER CONTROLLING DEVICE.

1,214,107.              Specification of Letters Patent.        Patented Jan. 30, 1917.

Application filed October 11, 1916.   Serial No. 125,090.

*To all whom it may concern:*

Be it known that I, HARRY YARNALL, a citizen of the United States, residing at Roosevelt, in the county of Klickitat and State of Washington, have invented certain new and useful Improvements in Foot-Lever Controlling Devices, of which the following is a specification.

The present invention has reference, generally, to improvements in controlling devices for levers; and, relates more particularly, to a foot lever controlling device which is especially adapted for use on Ford automobiles.

It is a well known fact that when driving up a steep hill that it is considerably difficult to reach the top of the hill without having to change the gears and it is likewise understood that it is necessary to hold the clutch pedal in a forward position so as to engage the low speed gear.

Therefore, as the primary object of this invention it is contemplated to provide novel means for removably holding the clutch pedal in a low geared position, thereby providing for the convenience of the driver of the automobile.

It is an equally important object of the present invention to provide means for releasing the holding means in order to permit of the return of the clutch pedal to its normal position.

Still further, the invention embraces the provision of a novel support adapted to be mounted on the clutch pedal and serving to support the pawl as well as the foot lever for releasing the pawl.

Among the other aims and objects of this invention may be recited the provision of a device of the character mentioned with a view to compactness, the number of parts of which are few, the construction simple, the cost of production small and the efficiency high.

Other improvements and novel details in the construction and arrangement of the various parts of the device will be brought out more in detail in the description to follow, which, for a clear understanding of the invention, should be considered in connection with the accompanying drawings, forming a part hereof, and wherein is disclosed for the purpose of illustration, a convenient and satisfactory embodiment of the invention. It is to be noted, in this connection, that minor changes in the construction and arrangement of the parts may be made without departing from the spirit of the invention or the principle of operation of the various parts.

The invention is clearly illustrated in the accompanying drawings in which:—

Figure 1 is a side elevation of my invention applied to the transmission mechanism of a motor vehicle. Fig. 2 is a front elevation of my invention and, Fig. 3 is a sectional detail.

Similar characters of reference are employed in all of the above described views, to indicate corresponding parts.

Referring now, more particularly, to the several figures of the said drawings I have illustrated a chassis 1 of a Ford automobile, the transmission casing 2 being suitably connected thereto by means of bracket 3 and positioned below the foot-board 4. A clutch pedal 5 is connected to a slow speed shaft 6. At this point it is to be understood that the above mentioned parts are only incidental to the present invention and are illustrated in order that a thorough comprehension can be had of the purpose thereof. It is likewise to be understood that the present invention can be used for controlling levers of various machines.

Connected to the dash 7 of the vehicle through the medium of a suitable fastening device, which may be and preferably is a nut and bolt arrangement 8, is one end of a bar 9, the opposite end thereof being connected to the chassis 1 by a suitable bracket 10. A segmental rack 11 is formed integral with the upper edge of the rear end of the bar and is positioned in close relation with the clutch pedal 5.

For the purpose of holding the clutch pedal in various adjusted positions and desirably in a low geared position I have provided my improved holding means which in the present instance consists of a supporting plate 12 bent to assume a U-shaped configuration in cross-section, said plate being straddled about the shank portion of the pedal and removably clamped thereon through the medium of bolts 13 and nuts 14. A pawl 15 is pivotally arranged about the lower of the bolts 13 and between the adjacent edges of the plate 12, the free end of the pawl being engageable with the teeth of the rack 11 and it will be appreciated when the lever is pressed forward into a low geared position, the pawl will hold the pedal in such position. Now, in order that the pawl may be readily released I have provided a substantially bell-crank foot lever 16 which is pivoted at its point of distortion about the upper of the bolts 13 in the plate 12. A connecting rod 17 has its respective ends pivotally connected to the short end of the bell-crank lever and to the pawl. The foot engaging portion 18 of the bell-crank foot lever 16 is bent arcuately and arranged adjacent the side of the foot engaging portion of the clutch pedal 5. Normally a leaf spring 19 which has one end rigidly connected to the plate by means of the upper bolt 13 and its other end bearing against the pawl 15, serves to hold the clutch pedal in an adjusted position but when pressure is exerted on the foot portion 18 of the bell-crank lever the pawl will be raised against the tension of the spring 19.

In order to return the clutch pedal to its normal position I employ a coil spring 20 which has one end rigidly connected to the shaft 6 and the other end rigidly connected in a bearing that supports the shaft.

The mode of operation of the invention may be reviewed as follows: Assuming that the automobile is moving up a hill on high speed and it is found that the top of the hill cannot be reached the driver of the vehicle will press the clutch pedal forwardly into a low geared position and inasmuch as the pawl 15 is arranged to engage the teeth of the rack 11 the pedal 5 will be held in the low geared position and will allow the driver to remove his foot from the pedal until the top of the hill is reached. When allowing the clutch pedal to return to a high speed position, the foot portion 18 of the bell crank lever is depressed to release the pawl and allow the clutch pedal 5 to be automatically returned to a high position.

Although I have shown my invention applied to a Ford automobile it is to be understood that the device can be readily associated with other levers and pedals for controlling the positions thereof and this is to be understood that I am not sacrificing any other use which may be had by slightly modifying the construction shown and described.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language might be said to fall therebetween.

Having described my invention, what I claim as new and desire to secure by Letters Patent is:—

1. A controlling device of the kind described to be used in combination with a spring pressed lever comprising a rack adapted to be connected to a suitable support, a plate to be secured to the lever, a pawl pivoted to the plate to engage the teeth of the rack, a bell crank lever pivoted to the plate, and means connecting the bell crank lever and the pawl for removing the pawl from engagement with the rack to allow the lever to return to its normal position when the bell-crank lever is depressed.

2. The combination with a spring pressed lever of a rigidly mounted rack arranged adjacent to the lever, a supporting plate clamped to the lever, a pawl pivotally mounted on the supporting plate means on the plate for holding the pawl in engagement with the teeth of the rack, a bell crank lever pivoted to the supporting plate, and means connecting the bell crank lever and the pawl whereby when the bell crank lever is depressed the pawl will be raised and consequently permit of the return of the spring pressed lever to its normal position.

3. The combination with a spring pressed foot lever, of a rigidly mounted rack arranged adjacent the side of the lever, a supporting plate removably connected to the lever, a pawl pivotally connected to the supporting plate and arranged to engage the teeth of the rack, a leaf spring rigidly connected to the supporting plate and bearing against the pawl for holding the pawl in engagement with the teeth of the rack, a substantial bell crank foot lever pivoted to the plate and arranged to one side of the foot pedal, and a connecting rod pivotally connected to the pawl and to the bell crank foot lever whereby when the bell crank foot lever is depressed the pawl will be raised from engagement with the teeth of the rack and permit of the return of the foot pedal to its normal position.

In testimony whereof I affix my signature in presence of two witnesses.

HARRY YARNALL.

Witnesses:
S. A. ROSSIER,
MARVIN O. JORDAN.

Copies of this patent may be obtained for five cents each, by addressing the "Commissioner of Patents Washington, D. C."